US012676041B1

(12) United States Patent
Gruner et al.

(10) Patent No.: US 12,676,041 B1
(45) Date of Patent: Jul. 7, 2026

(54) MODULAR ACCESSIBLE VOTING SYSTEMS AND METHODS

(71) Applicant: Clear Ballot Group, Inc., Nashua, NH (US)

(72) Inventors: Lucas Gruner, Boston, MA (US); Adam Meunier, Cumberland, RI (US); Michael Papa, Windham, NH (US); Savio Polini, Boston, MA (US)

(73) Assignee: Clear Ballot Group, Inc., Nashua, NH (US)

( * ) Notice: Subject to any disclaimer, the term of this patent is extended or adjusted under 35 U.S.C. 154(b) by 0 days.

(21) Appl. No.: 19/267,215

(22) Filed: Jul. 11, 2025

(51) Int. Cl.
*G07C 13/00* (2006.01)

(52) U.S. Cl.
CPC ......... *G07C 13/00* (2013.01); *G06Q 2230/00* (2013.01)

(58) Field of Classification Search
CPC ............................ G07C 13/00; G06Q 2230/00
USPC ............................................ 235/51, 56, 386
See application file for complete search history.

(56) References Cited

U.S. PATENT DOCUMENTS

| | | | |
|---|---|---|---|
| 5,216,438 A | 6/1993 | Nakao | |
| 5,883,043 A | 3/1999 | Halbrook, Jr. | |
| 6,759,366 B2 | 7/2004 | Beckerdite | |
| 6,784,906 B2 | 8/2004 | Long | |
| 7,166,558 B2 | 1/2007 | Bhatt | |
| 7,589,752 B2 | 9/2009 | Janning | |
| 8,096,471 B2 | 1/2012 | Cummings | |
| 9,346,285 B2 | 5/2016 | Rawlings | |
| 2003/0158775 A1 | 8/2003 | Chaum | |
| 2004/0140357 A1 | 7/2004 | Cummings | |
| 2005/0056698 A1* | 3/2005 | Cummings | G07C 13/00 235/386 |
| 2005/0247783 A1 | 11/2005 | Poulos | |
| 2006/0280534 A1 | 12/2006 | Cook | |
| 2007/0003339 A1 | 1/2007 | Edwards | |
| 2008/0003039 A1 | 1/2008 | Sekino | |
| 2009/0173778 A1 | 7/2009 | Cummings | |
| 2009/0272838 A1 | 11/2009 | Kaminaka | |

(Continued)

FOREIGN PATENT DOCUMENTS

CN 111348460 A 6/2020

OTHER PUBLICATIONS

"Voluntary Voting System Guidelines VVSG 2.0" Requirements for the Voluntary Voting System Guidelines 2.0, Prepared for the Election Assistance Commission, Feb. 10, 2021 (326 pages).

(Continued)

*Primary Examiner* — Suezu Ellis
(74) *Attorney, Agent, or Firm* — Klintworth & Rozenblat LLP

(57) ABSTRACT

A modular accessible voting system according to some embodiments includes: a tabulator having a top surface, a tabulator paper input, and a tabulator paper output; a ballot printer, the ballot printer being removably mechanically affixable to the top surface of the tabulator, the ballot printer having a printer paper output; and a hands-free ballot adapter, the ballot adapter being removably mechanically affixable between the tabulator and the ballot printer, such that when the ballot printer and the ballot adapter are affixed to the tabulator, the ballot adapter is operable to direct a printed ballot from the printer paper output to the tabulator paper input.

16 Claims, 14 Drawing Sheets

(56) References Cited

U.S. PATENT DOCUMENTS

| | | | | |
|---|---|---|---|---|
| 2010/0019036 | A1* | 1/2010 | Hawkins ................ | G07C 13/00 235/386 |
| 2010/0252628 | A1 | 10/2010 | Chung | |
| 2011/0017823 | A1 | 1/2011 | Baumert | |
| 2012/0061468 | A1 | 3/2012 | Arnao | |
| 2012/0119436 | A1 | 5/2012 | Morita | |
| 2018/0338053 | A1 | 11/2018 | Younis | |
| 2019/0034129 | A1 | 1/2019 | Iwata | |
| 2020/0027296 | A1 | 1/2020 | Hoover | |
| 2023/0196861 | A1 | 6/2023 | Canter | |

OTHER PUBLICATIONS

Epson, "DS-30000/DS-32000 User's Guide", Epson America, Inc. [accessed Sep. 4, 2025] https://files.support.epson.com/docid/cpd5/cpd58205.pdf, 2021 (172 pages).

Brother Online User's Guide. 2019 "Clean the Scanner and Rollers" Brother Industries, Ltd. [accessed Sep. 4, 2025] https://support.brother.com/g/s/id/htmldoc/ads/cv_ds635/use/index.html?c=us&lang=en&prod=ds940dw_us_eu_as#GUID-A346A5A0-3FE9-402B-8284-5640033A38C9_99 (2 pages).

"Verity Print—On-Demand Ballot Printing—Check-In + On-Demand Printing" Hart InterCivic Inc., 2022, [accessed Sep. 4, 2025] https://www.hartintercivic.com/wp-content/uploads/2023/04/SB_VerityPrintwAutoBallot0223.pdf (2 pages).

"Verity Touch Writer—Accessible Ballot Marking—Equal Access + Vote" Hart InterCivic Inc., 2022, [accessed Sep. 4, 2025] https://www.hartintercivic.com/wp-content/uploads/2023/04/SB_VerityTouchWriter0223.pdf (2 pages).

"Verity Scan—Secure Vote Capture—Scan + Cast" Hart InterCivic Inc., 2022, [accessed Sep. 4, 2025] https://www.hartintercivic.com/wpcontent/uploads/2023/04/SB_VerityScan0223.pdf (2 pages).

"Verity Duo Standalone—Touchscreen Ballot Marking with a Verifiable Paper Trail" Hart InterCivic Inc., 2022, [accessed Sep. 4, 2025] https://www.hartintercivic.com/wp-content/uploads/2023/04/SB_VerityDuoStandalone_0223.pdf (2 pages).

* cited by examiner

MODULAR ACCESSIBLE VOTING SYSTEMS AND METHODS

BACKGROUND

The present disclosure relates to systems and methods for use in voting and ballot tabulation.

In the development of voting technologies, concerns of accessibility, accuracy, reliability, and auditability are of paramount importance. The Voluntary Voting System Guidelines (VVSG), and specifically the latest release, VVSG 2.0, provides a set of guidelines for voting systems to provide desired levels of functionality, accessibility, and security. Aside from the goals of VVSG 2.0, organizing elections also involves the challenges of transporting, setting up, operating, and disassembling a large amount of equipment in a relatively short amount of time, often by personnel with limited levels of experience, and that equipment may need to be stored for much of the year. Thus, it is desirable to provide voting equipment that not only provides confidence in the outcome of an election, but that also employs technologies that simplify the logistical and operational aspects of implementing elections. Given the goal of providing election equipment that is capable of being used by different voters with different physical or cognitive capabilities in different jurisdictions with different election regulations, it is particularly challenging to develop equipment capable of satisfying these different requirements while also having a compact form factor to simplify storage and transport.

SUMMARY

A method according to some embodiments comprises: obtaining a plurality of tabulators, each of the plurality of tabulators having a user interface capable of receiving voter selections; obtaining at least a first ballot printer, the first ballot printer being interchangeably affixable to any one of the plurality of tabulators; mechanically affixing the first ballot printer to a first one of the tabulators; operating the first ballot printer to print at least a first ballot according to voter selections received at the first tabulator; and operating at least a second one of the tabulators to tabulate at least a second ballot, the second tabulator not being affixed to any ballot printer.

In some embodiments, the second ballot is a hand-marked ballot.

In some embodiments, obtaining at least a first ballot printer comprises obtaining a plurality of ballot printers, each of the ballot printers being interchangeably affixable to any one of the plurality of tabulators.

Some embodiments further include electronically connecting the first ballot printer to the first tabulator. The electronic connection may be independent of the mechanical connection.

Some embodiments further include: obtaining at least a first hands-free ballot adapter, the hands-free ballot adapter being removably engageable with any one of the plurality of tabulators; and mechanically affixing the first hands-free ballot adapter to the first tabulator and to the first ballot printer. Some such embodiments further include operating the first hands-free ballot adapter to direct a printed ballot from the printer paper output to the tabulator paper input.

In some embodiments, a number of hands-free ballot adapters obtained is less than a number of ballot printers obtained. In some embodiments, a number of ballot printers obtained is less than a number of tabulators obtained.

A system according to some embodiments comprises: a tabulator having a top surface, a tabulator paper input, and a tabulator paper output; a ballot printer, the ballot printer being removably mechanically affixable to the top surface of the tabulator, the ballot printer having a printer paper output; a hands-free ballot adapter, the ballot adapter being removably mechanically affixable between the tabulator and the ballot printer, such that when the ballot printer and the ballot adapter are affixed to the tabulator, the ballot adapter is operable to direct a printed ballot from the printer paper output to the tabulator paper input.

In some embodiments, the ballot adapter and the ballot printer include complementary electrical connections configured to be engaged when the ballot adapter is affixed between the tabulator and the ballot printer. In some such embodiments, the ballot adapter includes at least one motor for driving a ballot through the ballot adapter, and power for the motor is supplied to the ballot adapter through the complementary electrical connection with the ballot printer.

In some embodiments, the ballot printer is configured to transmit a signal, such as an optical signal, regarding ballot feeding speed to the tabulator. In some such embodiments, the tabulator is configured to synchronize a ballot feeding speed based on the signal. In some embodiments, a signal such as the optical signal conveys information regarding error conditions such as paper jams from the ballot printer to the tabulator. In some embodiments, the optical signal conveys information regarding the position of the paper in the system.

In some embodiments, the tabulator further includes a touch screen that is foldable between at least a first configuration in which the touch screen is substantially even with the top surface and a second configuration in which the touch screen extends upwards from the top surface.

A tabulator apparatus according to some embodiments comprises: a top surface having a printer support region capable of supporting a ballot printer, the top surface further including a user interface region; a paper input, a paper output, a paper path between the paper input and the paper output; at least one optical scanner along the paper path; and a touch screen mounted on the user interface region of the top surface, the touch screen being foldable between at least a first configuration in which the touch screen is substantially even with the top surface and a second configuration in which the touch screen extends upwards from the top surface.

In some embodiments, the tabulator further includes logic for receiving voter selections through the touch screen and for instructing a ballot printer to print a ballot according to the voter selections.

In some embodiments, the printer support region includes at least one aperture capable of receiving corresponding protrusions from a ballot printer.

In some embodiments, the printer support region includes a removable cover capable of covering the at least one aperture.

In some embodiments, the printer support region includes a sensor configured to receive a signal regarding ballot feeding speed, error conditions, or paper position, and wherein the tabulator is configured to synchronize a ballot feeding speed through the paper path based on the signal.

DETAILED DESCRIPTION

To allow for full participation in the democratic process, it is desirable for each polling place to have equipment that is capable of serving the needs of voters with all ranges of physical abilities. Some voters may be capable of reading and completing a ballot by hand (for example, by filling in ovals to mark their selections). Other voters may benefit from assistance in reading a ballot, completing the ballot, casting the ballot, or at some other stage of the process. It is desirable for this assistance to be provided in an automated way to protect the confidentiality of the voter's selections. However, assistive equipment is generally expensive, and it can strain the budgets of the governments charged with running elections, particularly for equipment that may only be used on a couple of occasions each year. Budgeting and planning for such elections can be especially difficult where it may not be possible to predict the number of voters who will be making use of assistive equipment. Acquiring too much equipment depletes taxpayer funds that could more beneficially have been allocated to other uses, while acquiring too little equipment creates another unnecessary barrier for voters with the greatest needs.

Example embodiments provide modular voting systems and methods that are intended to address these issues.

Figure 1:
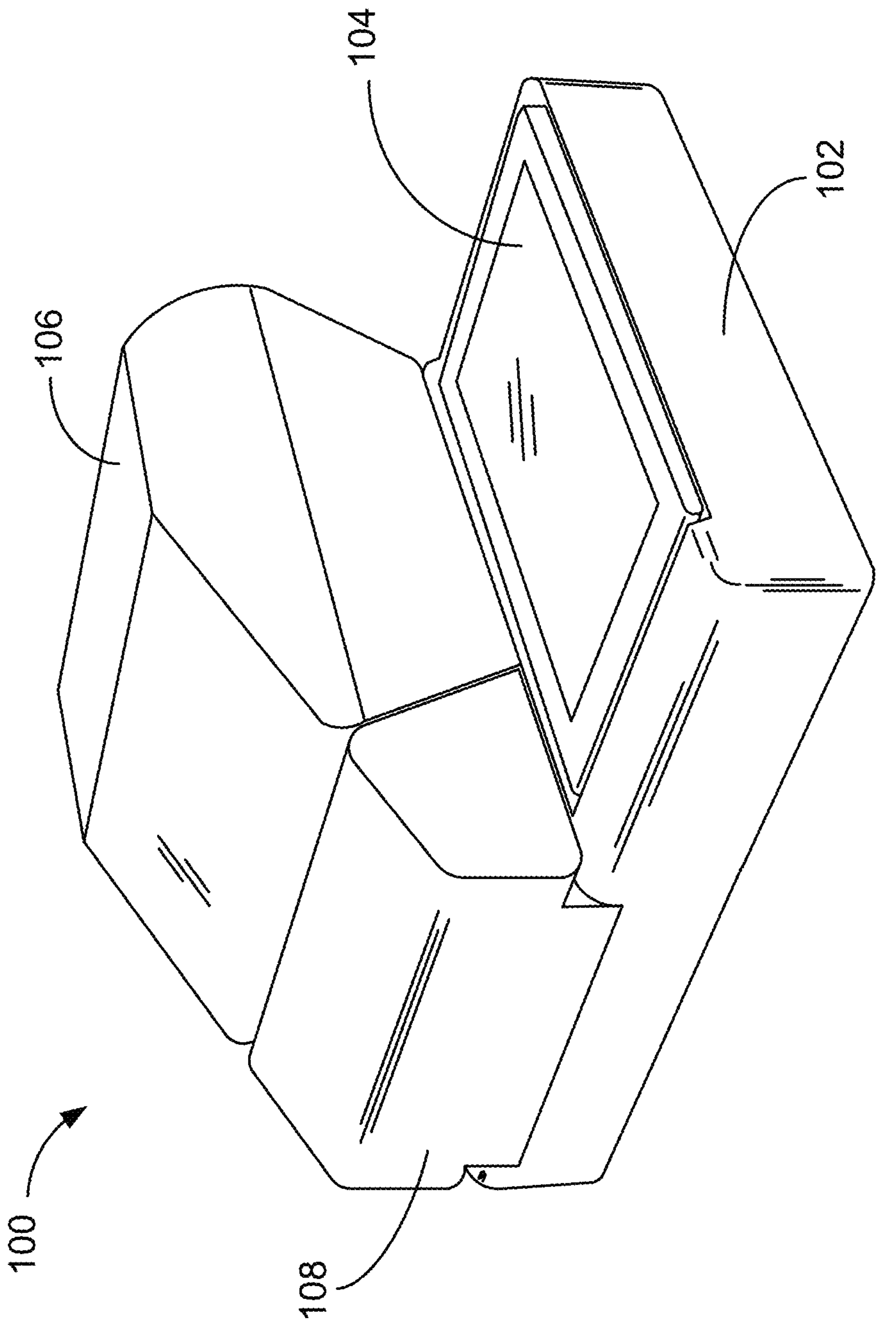
FIG. 1 is a perspective view of a modular accessible voting system according to some embodiments.
Figure 2:
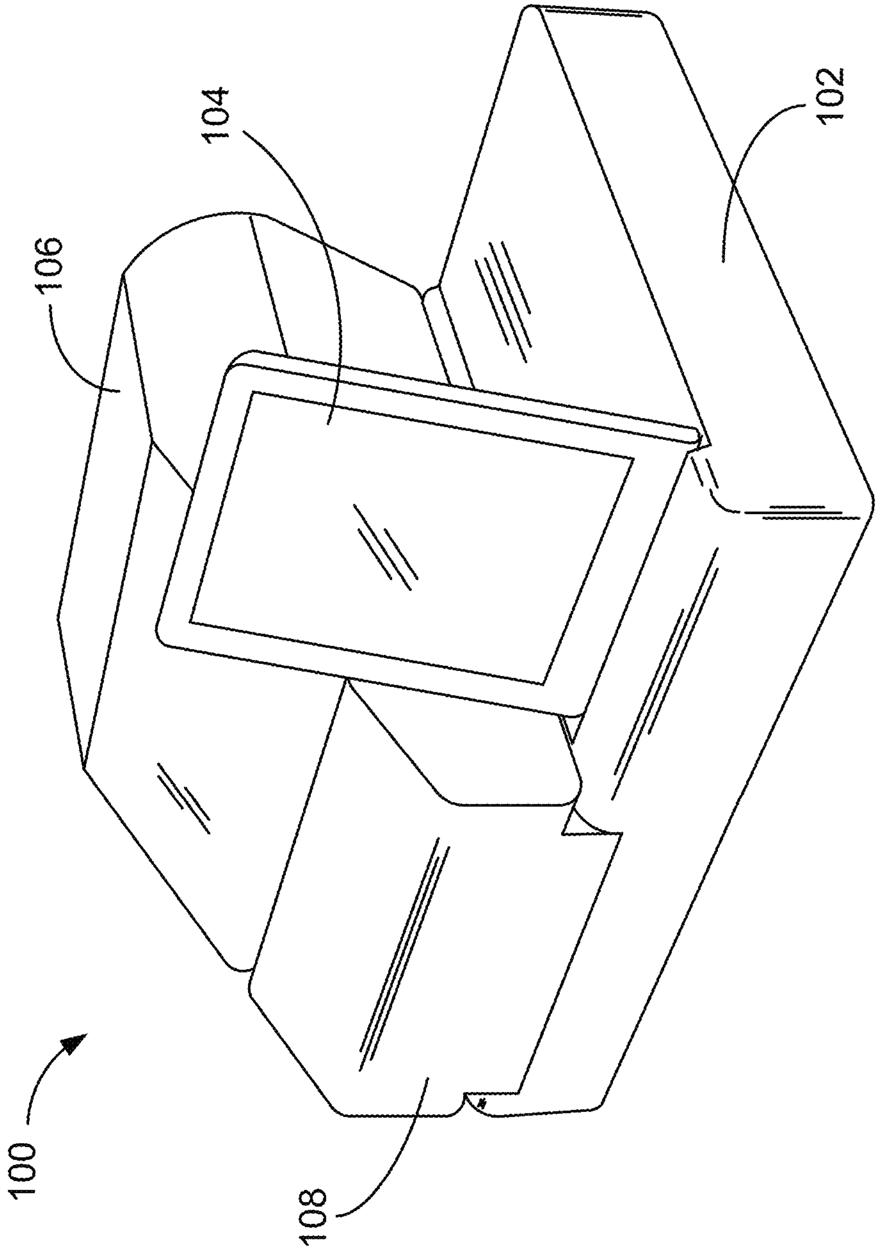
FIG. 2 is a perspective view of the modular accessible voting system of FIG. 1, with a user interface 104, such as a touch screen, in an extended position.

As illustrated in FIG. 1, in an example embodiment, a modular system 100 includes a tabulator 102. A ballot printer 106 is supported on the top surface of the tabulator and configured to print ballots, and a hands-free ballot adapter 108 can be operated to direct a printed ballot from the printer paper output to the tabulator paper input. The tabulator includes a user interface 104, such as a touch screen, that is capable of receiving voter selections. In the illustration of FIG. 1, the user interface 104 is shown in a folded-down or storage position that is substantially even with the top surface of the tabulator. FIG. 2 illustrates the same modular system as FIG. 1 but with the user interface 104 in a deployed position, extending upward from the top surface of the tabulator for easier access by voters. The ballot printer 106 is operable to print filled-out ballots according to voter selections entered through the user interface 104, and the hands-free ballot adapter 108 is operable to direct those ballots to the tabulator. The tabulator, in turn, scans the printed ballot and records the votes as appropriate.

In some embodiments, the tabulator 102 further includes circuitry for providing assistive audio and for receiving input through an accessible keypad, such as the keypad described in U.S. patent application Ser. No. 29/991,531, filed 28 Feb. 2025, entitled "Accessible Input Keypad." and/or through a two-position switch device such as a sip-and-puff input device.

A system as shown in FIG. 1 and FIG. 2 allows voters to enter their selections using the touch screen interface 104 and/or an accessible input device, to print their ballot using the ballot printer 106, and to cast their ballot at the tabulator 102 even if they may have difficulty reading, filling out, or transporting a paper ballot on their own. However, a system capable of performing all of these operations (while also satisfying other security and reliability considerations) can be expensive, and the use of such a system may not be necessary or desirable to many voters.

Accordingly, example embodiments allow for systems to be deployed on a modular basis to help maximize the value added by each individual piece of equipment.

Figure 3:
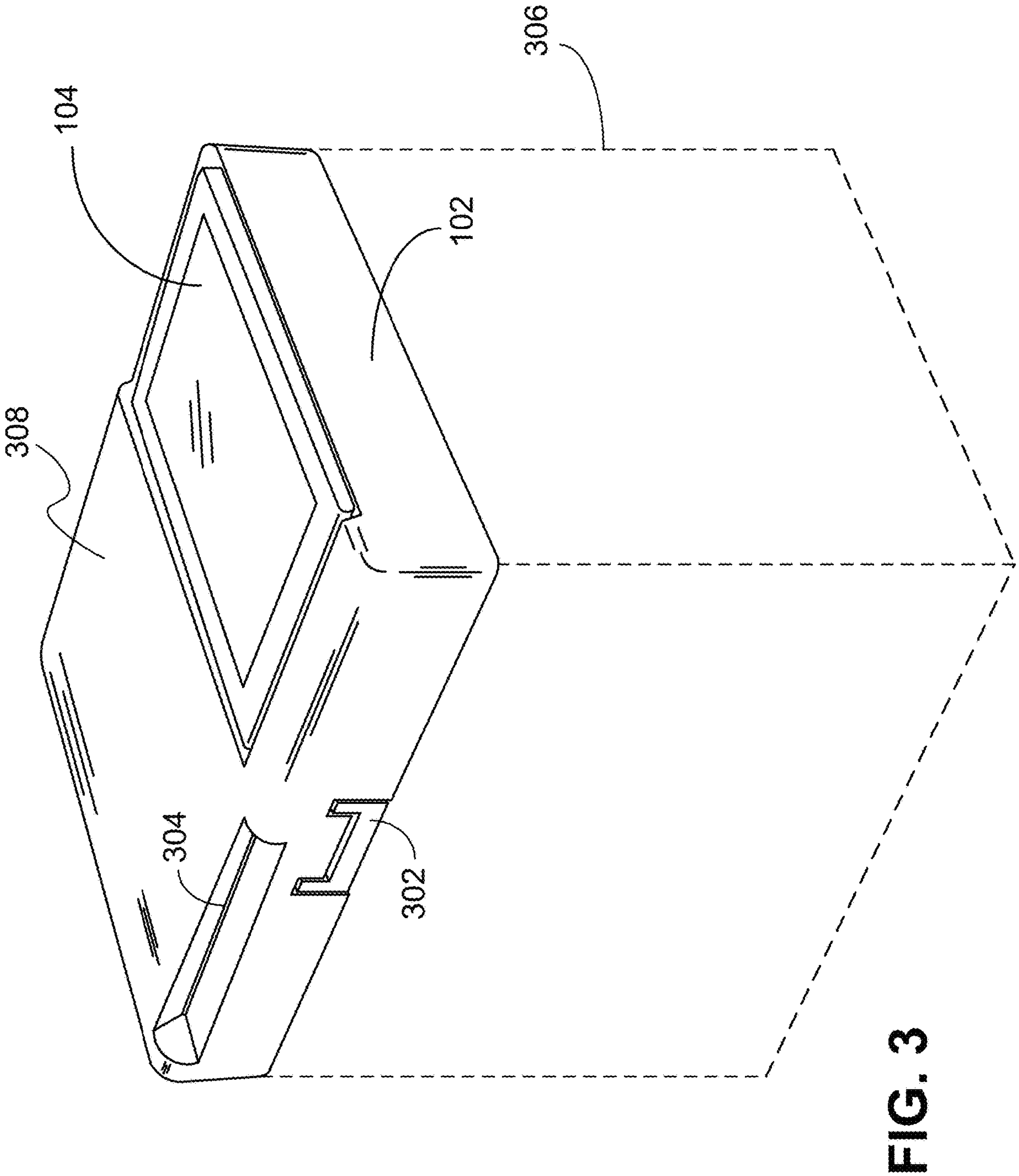
FIG. 3 is a perspective view of a tabulator component of a modular accessible voting system according to an example embodiment.

As illustrated in FIG. 3, the tabulator 102 is capable of being transported and deployed as a separate component. In FIG. 3, the tabulator 102 is illustrated with a handle 302 for easier transport, but it should be understood that such a handle may have a different position or may be omitted. The tabulator 102 includes a paper input 304 for receiving ballots. The tabulator further includes a paper output, which may be for example on a bottom or rear surface of the tabulator and is not visible in FIG. 3. A paper path extends in the tabulator from the paper input to the paper output, and at least one optical scanner is positioned along the paper path to scan ballots to be tabulated. In use, the tabulator 102 may be bolted or otherwise securely fixed to a ballot box 306 that collects cast ballots that have been ejected from the paper output of the tabulator. In a configuration as in FIG. 3, the user interface 104 may be used to display information regarding that tabulation, such as information regarding whether reading of the ballot was successful and/or how the ballot is being interpreted by the tabulator. The user interface 104 may be extended upward as in FIG. 2 for easier viewing.

The tabulator module 102 may be employed on its own, without the ballot printer module or the ballot adapter module. While the tabulator module 102 includes a printer support region 308 on its top surface, no ballot printer is connected to the tabulator module in the configuration of FIG. 3. To make use of this configuration, the tabulator module 102 may be used to tabulate ballots that have been filled in by hand, whether at the polling site or elsewhere (e.g. through mail-in voting). In some cases, low-cost ballot booths may be arranged at the polling place to allow some voters to fill in their ballots privately on site.

Figure 4:
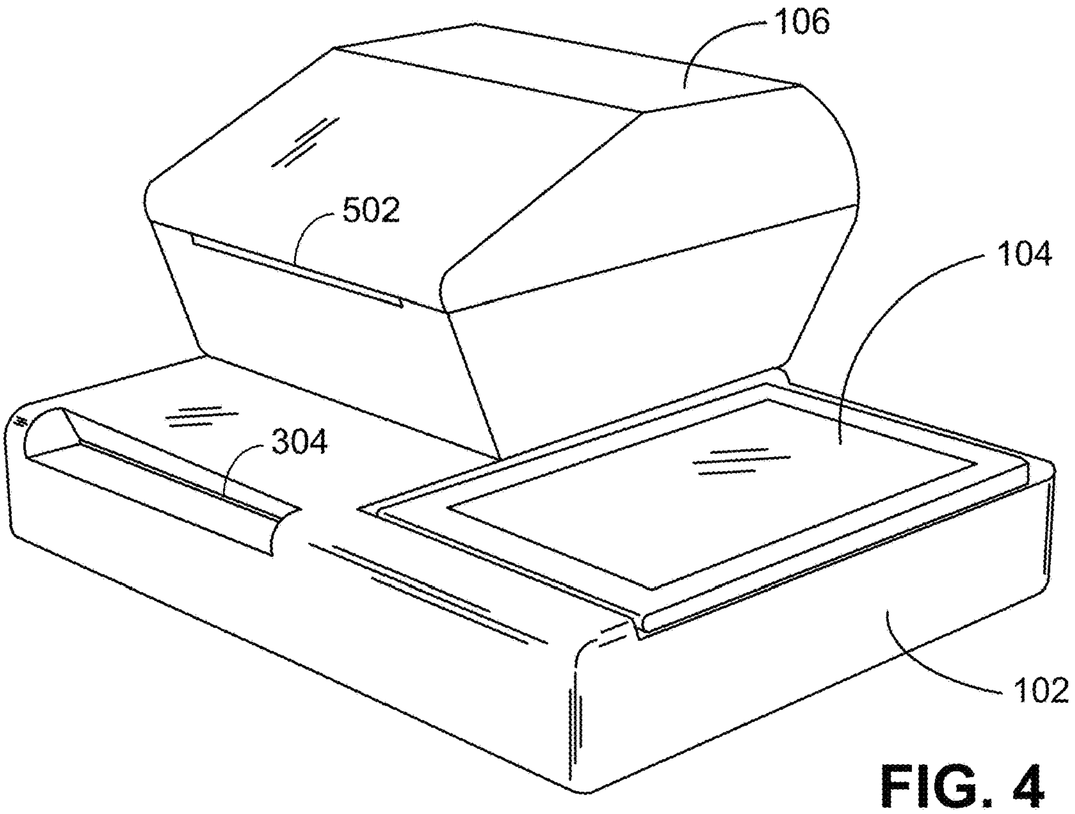
FIG. 4 is a perspective view of a tabulator and ballot printer component affixed to one another according to an example embodiment.
Figure 5:
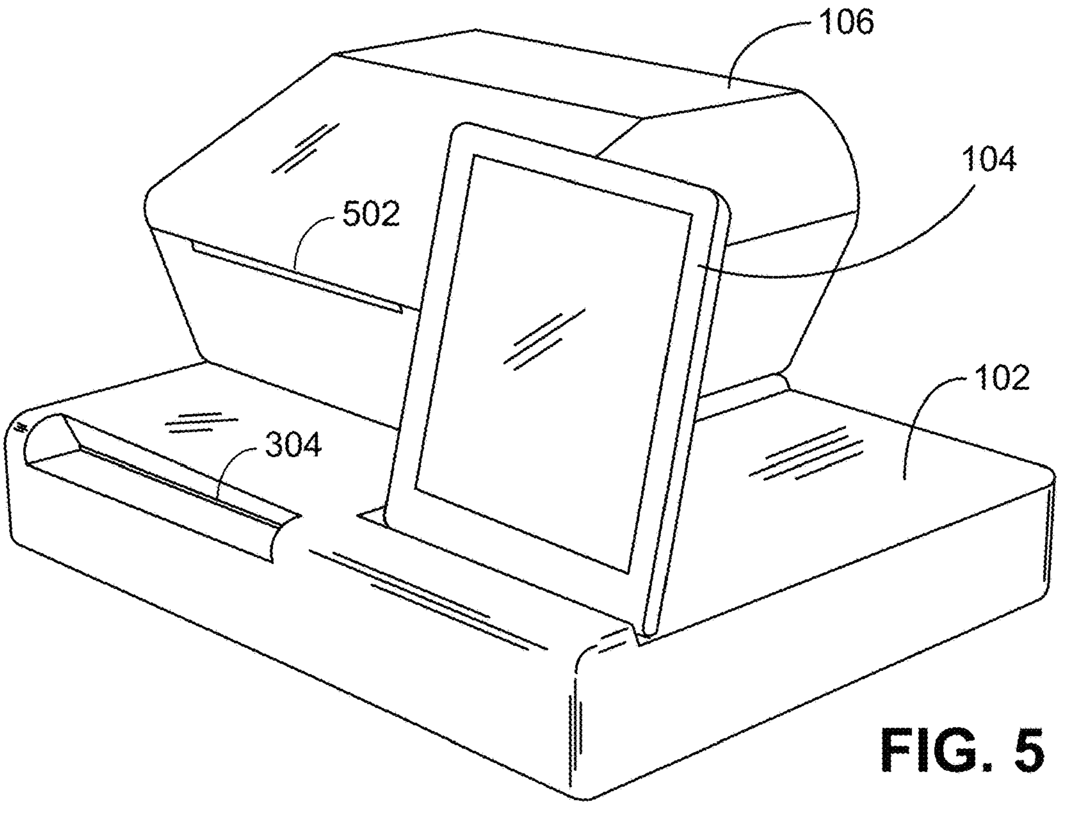
FIG. 5 is a perspective view of the modular accessible voting system of FIG. 4, with a user interface 104, such as a touch screen, in an extended position.

In another configuration, as illustrated in FIG. 4 and FIG. 5, a ballot printer module 106 is supported on the printer support region 308. The printer may be removably mechanically affixed to the top surface of the tabulator 102. In FIG. 4, the user interface 104 is folded flat, substantially even with the top surface of the tabulator, and it defines a user interface region of the top surface of the tabulator. As seen in FIG. 5, however, the position of the ballot printer on the printer support region does not interfere with the ability of the user interface 104 to be extended upward for use.

In a configuration as shown in FIG. 5, in which the printer module 106 is affixed to the tabulator module 102, the system may be employed in different ways by different voters. For example, a voter who has manually completed their ballot does not need to enter their votes through the user interface 104 and does not need to make use of the ballot printer 106. Instead, such a voter may deposit their ballot directly into the tabulator paper input 304. However, a voter who cannot or does not wish to complete the ballot manually may also make use of the configuration of FIG. 5 by entering their votes through the user interface 104 (or other user interface elements, such as assistive voting interfaces). The tabulator 102 then communicates with the ballot printer 106 (e.g. through an electrical cable) to cause the printer to print a paper ballot reflecting the voter's selections. In some embodiments, the printed paper ballot has a layout that is substantially the same as or indistinguishable from the layout of a hand-completed ballot, except that the ovals or other markings may be filled in by the printer instead of by hand. The printed ballot is ejected from the ballot printer though a printer paper output 502. The voter is then free to inspect the printed ballot to confirm its accuracy, and after approving the contents of the ballot, the voter can cast the ballot by inserting the ballot into the tabulator paper input 304 of the tabulator 102, making use of the system as in the configuration of FIG. 3.

However, voters may be unable to manually transport the printed ballot from the printer paper output 502 to the tabulator paper input 304. For such voters the system may be configured as shown in FIGS. 1 and 2, with the hands-free ballot adapter 108 removably affixed to the system and configured to transport a printed ballot from the printer paper output 502 to the tabulator paper input 304. In some embodiments, the voter may still confirm the accuracy of the tabulator's interpretation of the ballot through a user interface 104 (or other user interface elements, such as assistive voting interfaces) before the ballot is cast and deposited in the ballot box.

In some embodiments, the hands-free ballot adapter 108 is capable of being added to or removed from the system while the ballot printer 106 is affixed to the tabulator 102.

Figure 6:
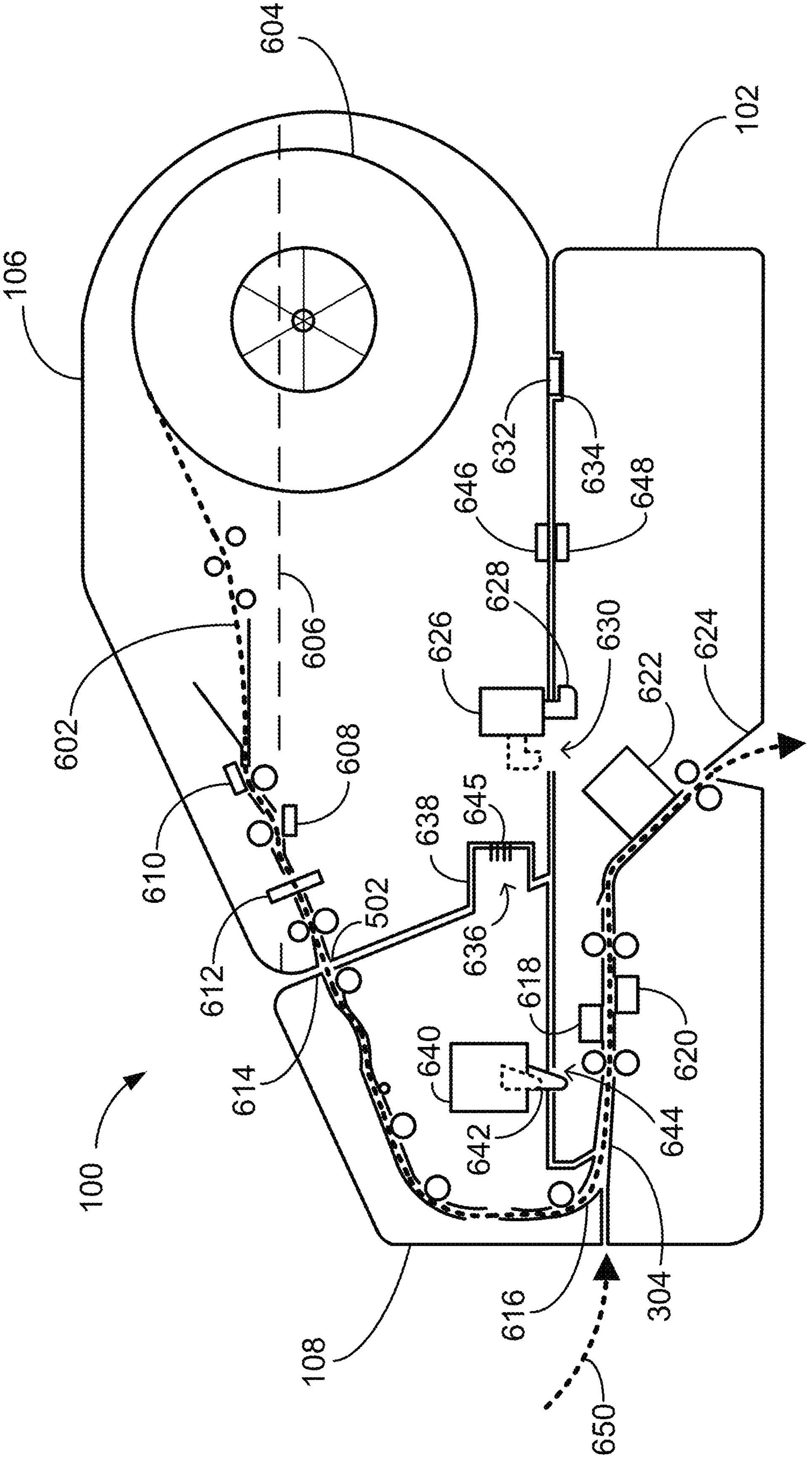
FIG. 6 is a schematic cross-sectional view of a modular accessible voting system according to some embodiments.

A cross-section providing a schematic overview of an example system 100 is provided in FIG. 6. The paper path through the system is illustrated using heavy dashed line 602. It should be understood that the details of the paper path and of the components along the paper path may be different in different embodiments. In an example embodiment, the ballot printer 106 includes a paper roll 604 that provides blank paper onto which ballots are to be printed. The top of the ballot printer 106 may be openable, e.g. along dashed line 606, to allow for replacement of the paper roll 604 when it is depleted. A combination of active and passive rollers (not individually numbered) guide the paper toward print heads 608, 610, that allow in some embodiments for printing on both sides of the paper. In some embodiments, where the paper roll is continuous, a paper cutter mechanism 612 may be provided to cut the continuous paper from the roll to the appropriate length of an individual ballot.

After being printed and cut, the ballot exits the printer paper output 502 and enters an adapter paper input 614 of the ballot adapter 108. The adapter 108, using a combination of active and passive rollers (not individually numbered), guides the ballot from the printer paper output 502 and out the adapter paper output 616 to the tabulator paper input 304.

The tabulator 102, using a combination of active and passive rollers (not individually numbered), guides the ballot past optical scanning heads 618, 620 to image the ballot. In some embodiments, an imprinter 622 may be provided to imprint unique (but anonymous) identifiers on ballots once they have been cast. After processing by the tabulator 102, the ballot is ejected through a tabulator paper output 624, for example into a ballot box.

In some embodiments, the tabulator 102 may be implemented as described in U.S. patent application Ser. No. 18/943,379, filed Nov. 11, 2024, entitled "Low Profile Apparatus for Ballot Tabulation and Imprinting of Unique Identifiers," which is incorporated herein by reference in its entirety. As described therein, a tabulator stores information regarding tabulated ballots. This information may include, as non-limiting examples, cast vote records or other data reflecting the votes on individual ballots and/or the total number of votes, digital images of cast ballots, or other data.

In different embodiments, different techniques may be employed to removably affix the different components with one another to allow for flexibility and interchangeability. In the example of FIG. 6, a first release mechanism 626 in the ballot printer 106, such as a rotatable engagement hook assembly, is operable to provide a releasable mechanical engagement between the ballot printer and the tabulator 102. Through a lever or knob or other component, which may be manual or automated, one or more protrusions such as engagement hooks 628 can be rotated into a corresponding opening or recess 630 on the top surface of the tabulator. (Among other variations, the engagement hooks could be part of the tabulator, and the recesses could be part of the printer.) In some embodiments, feet 632 of the printer can be stabilized in corresponding recesses 634 on the top surface of the tabulator. The feet and corresponding recesses may also aid in alignment of the ballot printer with respect to the tabulator, for example to provide for proper alignment of the engagement hooks with the tabulator, or proper positioning of the printer and tabulator when a hands-free ballot adapter is to be connected to the printer and the tabulator. In some embodiments, the removable mechanical connection between printer and the tabulator may be enhanced with the addition, for example, of a bolted connection.

In some embodiments, the top surface of the tabulator may be equipped with a removable cover or panel (not shown) to cover the openings 630 when the tabulator is not mated with a printer.

In the example of FIG. 6, a releasable mechanical connection between the adapter 108 and the printer 106 is made with the use of a protrusion 636 of the adapter that is accommodated by a corresponding recess 638 in the printer. From the perspective of the drawing of FIG. 6, this connection is made by sliding the adapter 108 to the right. The adapter may be provided with a second release mechanism 640. The release mechanism 640 in some embodiments includes one or more detent mechanisms 642 that are movable between an extended and retracted position, e.g. using a lever, knob or other component. In an extended position, the detent mechanism 642 extends into corresponding recesses or openings 644 in the tabulator 102, preventing the adapter from moving away from and thus disengaging with the recess 638 in the printer. In a retracted position, the detent no longer holds the adapter in place, and the adapter can be removed from the system.

In some embodiments, the releasable mechanical connection between the recess 638 of the printer and the protrusion 636 of the adapter also includes a releasable electrical connection 645, with conductors (e.g. prongs) on the printer side engaging with corresponding conductors (e.g. sockets) on the adapter side. In this way, establishing the mechanical connection also establishes the electrical connection between the components without requiring an additional setup step. The electrical connection between the printer and the adapter may be used, for example, to power one or more of the active rollers in the adapter. In some embodiments, the electrical connection may also be used to synchronize the speed of such rollers to the speed of the output of the printer and/or to exchange information with the printer regarding the existence of any error states, such as paper jams.

In example embodiments, ballots can be inserted into the paper input 304 of the tabulator 102 without passing through the adapter 108 through an alternate paper path 650, which may be in a gap below the adapter or through an opening in the adapter, for example. This allows for the tabulator to be used to tabulate, for example ballots completed by hand, even when the adapter is in place.

In some embodiments, the printer includes a data transmitter 646, such as a digital optical data transmitter, on the bottom surface thereof. The tabulator includes a compatible receiver, such as a digital optical data receiver, on the top surface thereof. The data transmitter 646 in some embodiments transmits information regarding a paper speed of the printer output, which can be received by a receiver 648 the tabulator 102 and used to synchronize rollers within the tabulator to the speed of the printer output, to provide error information, to provide information on paper position, or to provide other information.

Figure 7:
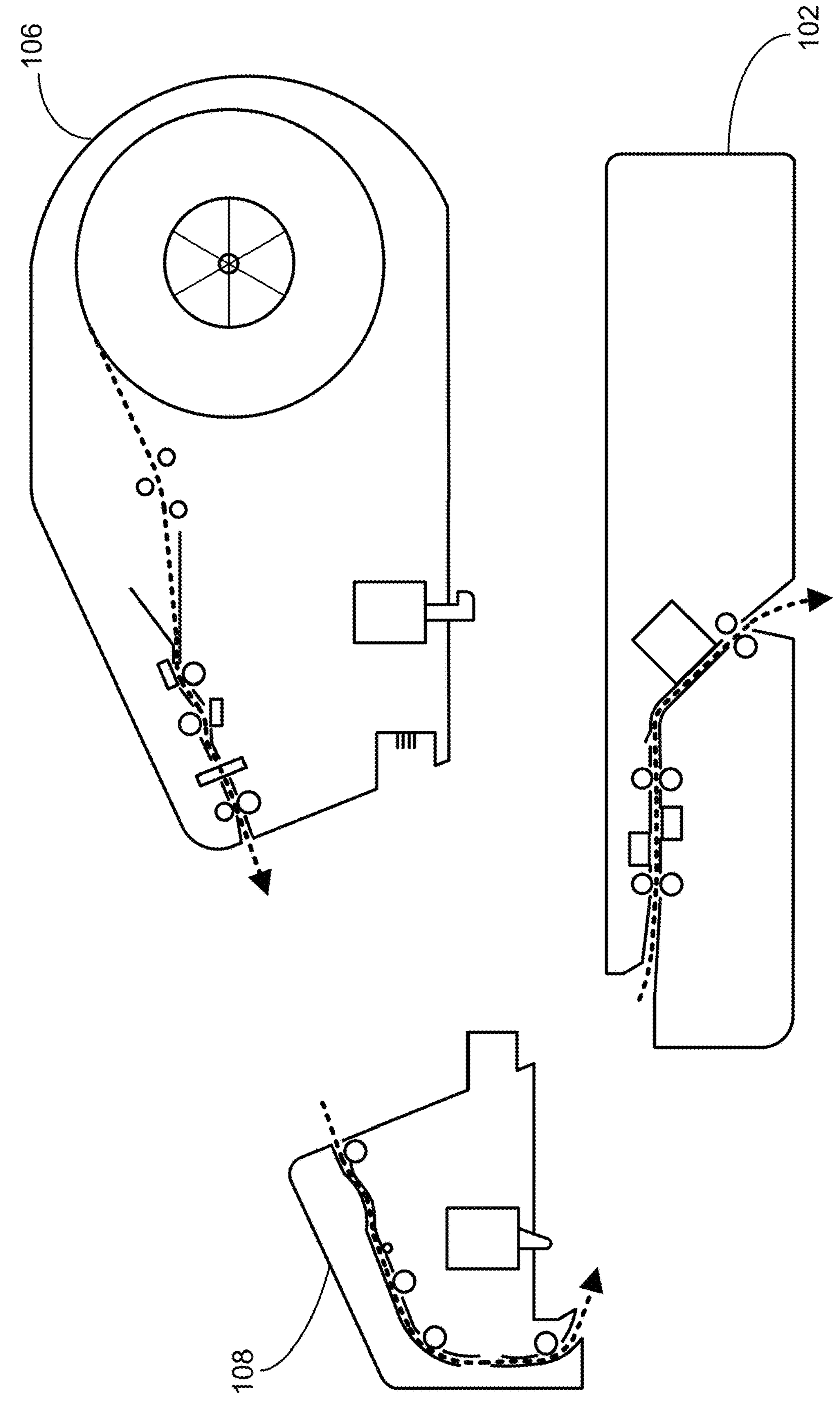
FIG. 7 is an exploded schematic cross-sectional view of the system of FIG. 6.

FIG. 7 is a schematic cross-sectional view of the components of FIG. 6, illustrated in a separated configuration. The tabulator 102, ballot printer 106, and adapter 108 may be separated from one another when not needed for use, for example when such components are stored between elections.

Figure 8:
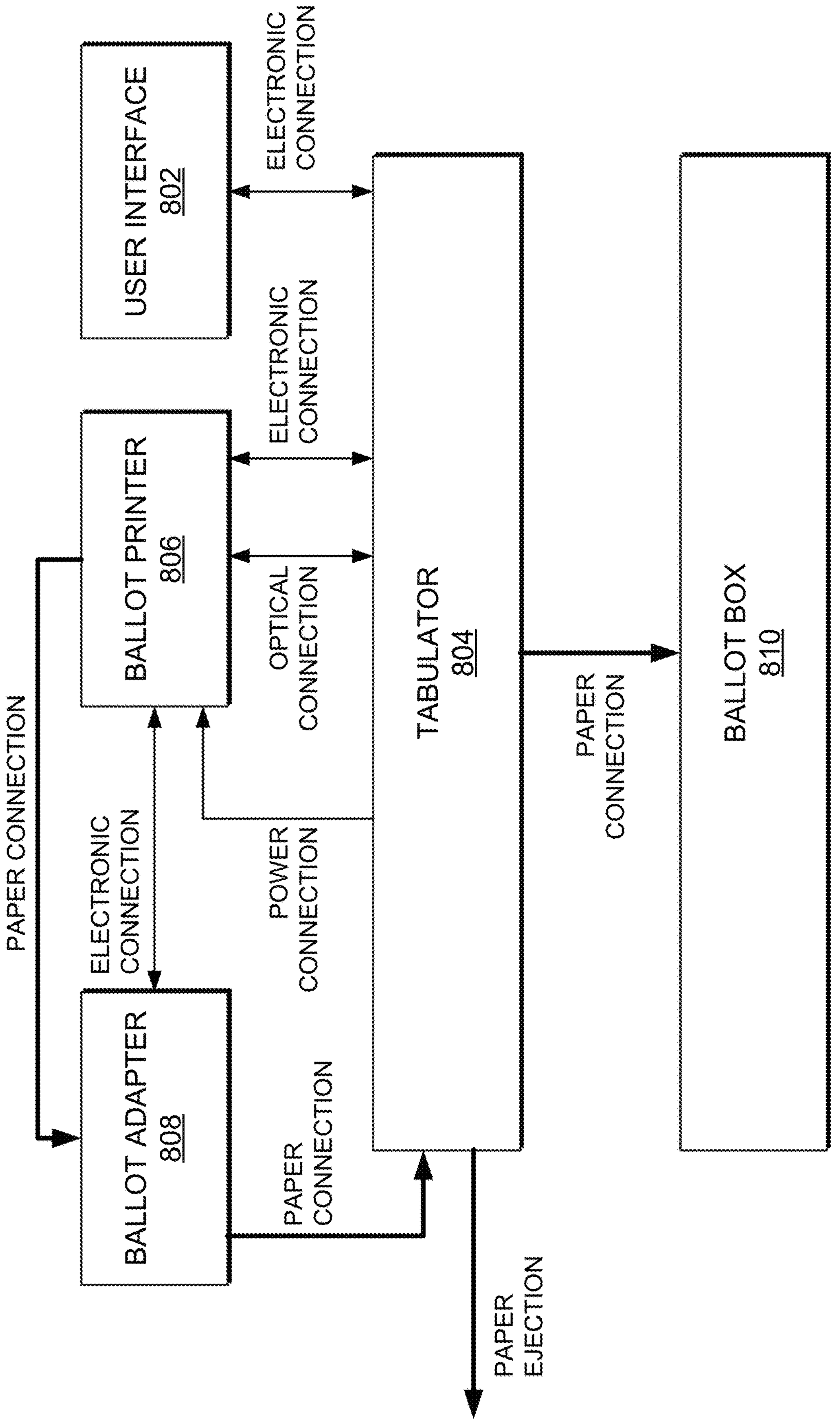
FIG. 8 is a functional block diagram that schematically illustrates logical data connections and paper flow among components of a modular accessible voting system according to some embodiments.

FIG. 8 is a schematic block diagram illustrating an example interconnection between components of the system. A user interface 802 has an electronic connection with a tabulator component 804. The user interface 802 may, in some configurations, be used to receive a voter's selections and convey those selections to the tabulator over the electronic connection. In some configurations, a ballot printer component 806 also has an electronic connection with the tabulator 804. The electronic connection may include, for example, a standard USB-B or other data cable used to instruct the printer 806 to print a ballot reflecting the voter's selections. The tabulator and the printer may also have an optical connection as described above to synchronize paper movement through the system, although in other embodiments this may be omitted or handled using the electronic connection. In some embodiments, there is also a power connection between the printer and the tabulator. For example, the tabulator may supply power to the printer through a three-pin power DIN connector. In this way, setup is simplified because only one AC power cord is needed for the system (e.g. from the tabulator to a wall socket), and it provides resilience because the printer (and adapter if attached) can all operate off the same battery backup, which may be provided in the tabulator.

In some configurations, a ballot adapter 808 is also in use. The ballot printer 806 has a paper connection with the ballot adapter 808 in that a paper ballot printed by the ballot printer 806 is delivered to the ballot adapter 808. The ballot adapter and the ballot printer may also have an electronic connection through which active rollers of the ballot adapter are driven and through which paper jams or other issues may be communicated. The ballot adapter 808 also has a paper connection with the tabulator 804. Paper ballots received at the tabulator 804 may be deposited in a ballot box 810. The tabulator may also provide for ballots to be ejected to allow issues to be corrected, for example if the ballot cannot be read or if there is some other issue that the voter may wish to correct.

Figure 9B:
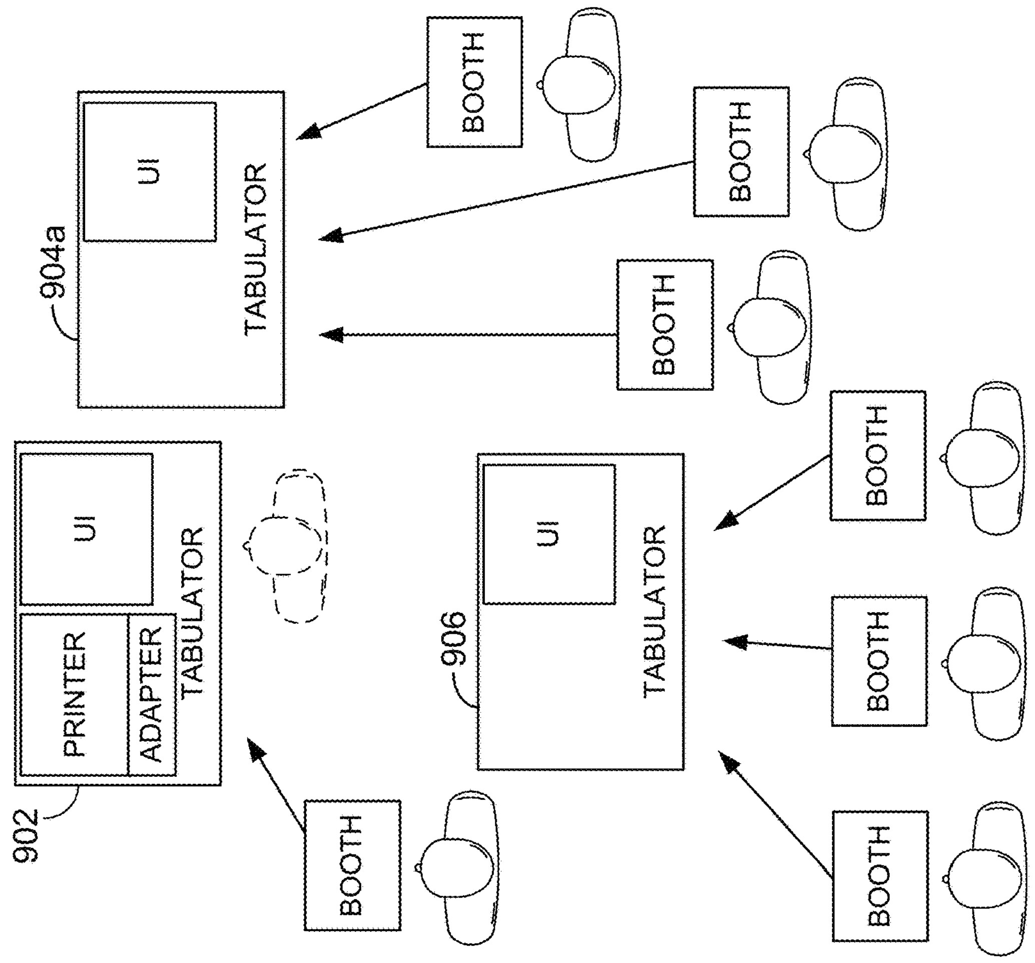
FIGS. 9A-9C are schematic plan views of different example voting configurations that may be set up at a polling place using different configurations of modular accessible voting systems according to some embodiments.
Figure 9A:
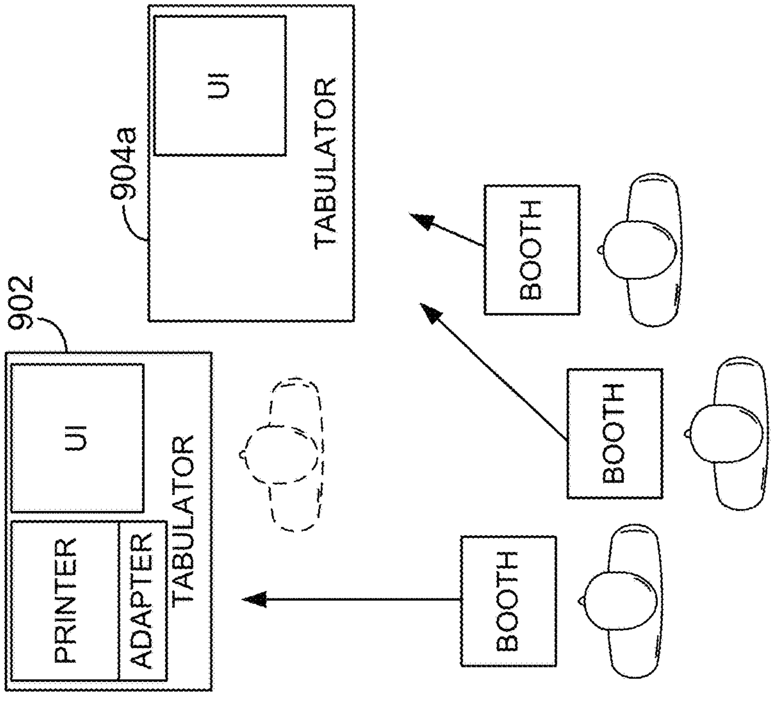
Figure 9C:
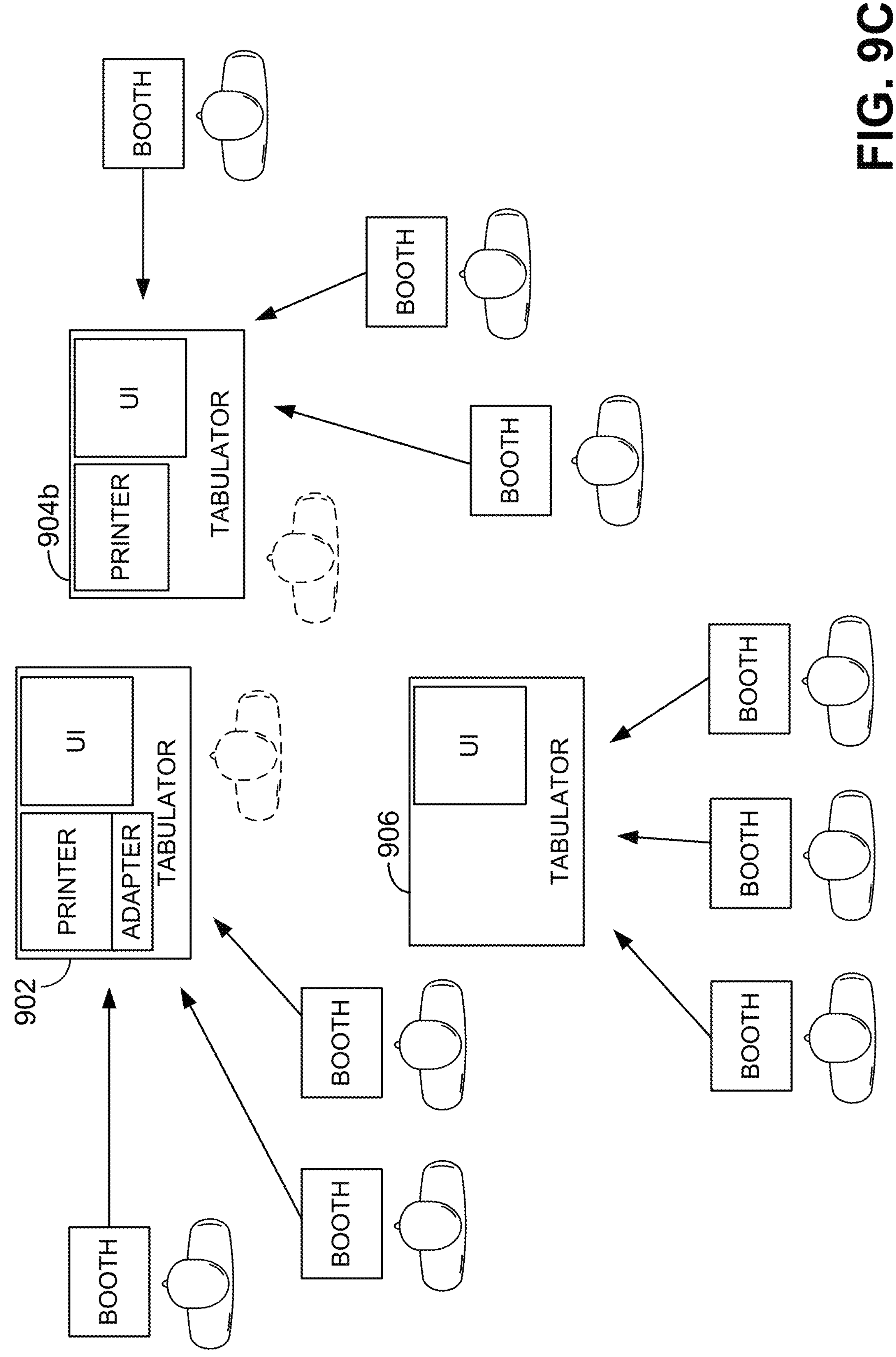

FIGS. 9A-9C schematically illustrates different configurations of a polling place that may be implemented using embodiments of a modular accessible voting system as described herein. In the example of FIG. 9A, only two systems are used. One of those systems 902 includes a tabulator mated to both a printer and adapter, providing assistive voting capacity for voters who require or prefer it. A second one of the tabulator components 904*a* is not mated to any printer or adapter. This component can be used to tabulate ballots that have been completed by hand, for example by voters who have been provided with low-cost private voting booths. When no voter is using system 902 for voting, that system may also be used to tabulate ballots that have been completed by hand. In addition, the use of systems 902 and 904*a* with two tabulators allows for tabulation to continue even if one of the systems is out of service.

FIG. 9B illustrates a configuration in which the systems 902 and 904*a* are in use and in which another system 906 is also provided. System 906 in this example includes a tabulator without a printer or ballot adapter. It can be used to increase the capacity for tabulating ballots that have been filled in by hand, while the system 902 provides assistive voting access. Moreover, example embodiments provide resiliency to the failure of individual components. For example, if the tabulator of system 902 fails, the printer and ballot adapter affixed to that tabulator can be released and affixed to a different tabulator, such as the tabulator of system 904*a* or 906, preserving voting opportunities for voters who require those technologies. This effectively provides a hands-free backup voting system without the high cost of purchasing a complete additional hands-free voting system that may be used only rarely.

FIG. 9C schematically illustrates a third configuration in which system 902 is still in use, and in which system 904*a* has been mated to a printer and is now labeled 904*b*. In this way systems 902 and 904*b* provide different levels of assistive technology for voters, while increasing the capacity for tabulating hand-marked ballots when the ballot printing capabilities of those systems are not in use.

The examples of FIGS. 9A-9C are only three examples out of a large variety of configurations that can be implemented using modular accessible voting systems and methods as described herein. Different precincts can select different numbers and arrangements of components based on factors such as their budget, their overall expected number of voters, the percentage of such voters who may benefit from different levels of accessible voting technologies, and relevant local laws and regulations. Moreover, as the needs of a precinct change, additional tabulator, printer, and/or adapter modules can be added to improve capacity without the need to purchase an entire tabulator-printer-adapter system.

In example embodiments, the tabulators are operated using application software, and the application software is the same for all of the tabulators. Such systems promote ease of use by operating using the same application software even in the different available configurations. The user experience is consistent regardless of whether the tabulator is used on its own, with an attached printer, or with both a printer and adapter. This consistency helps to reduce the training requirements for poll workers.

Figure 10:
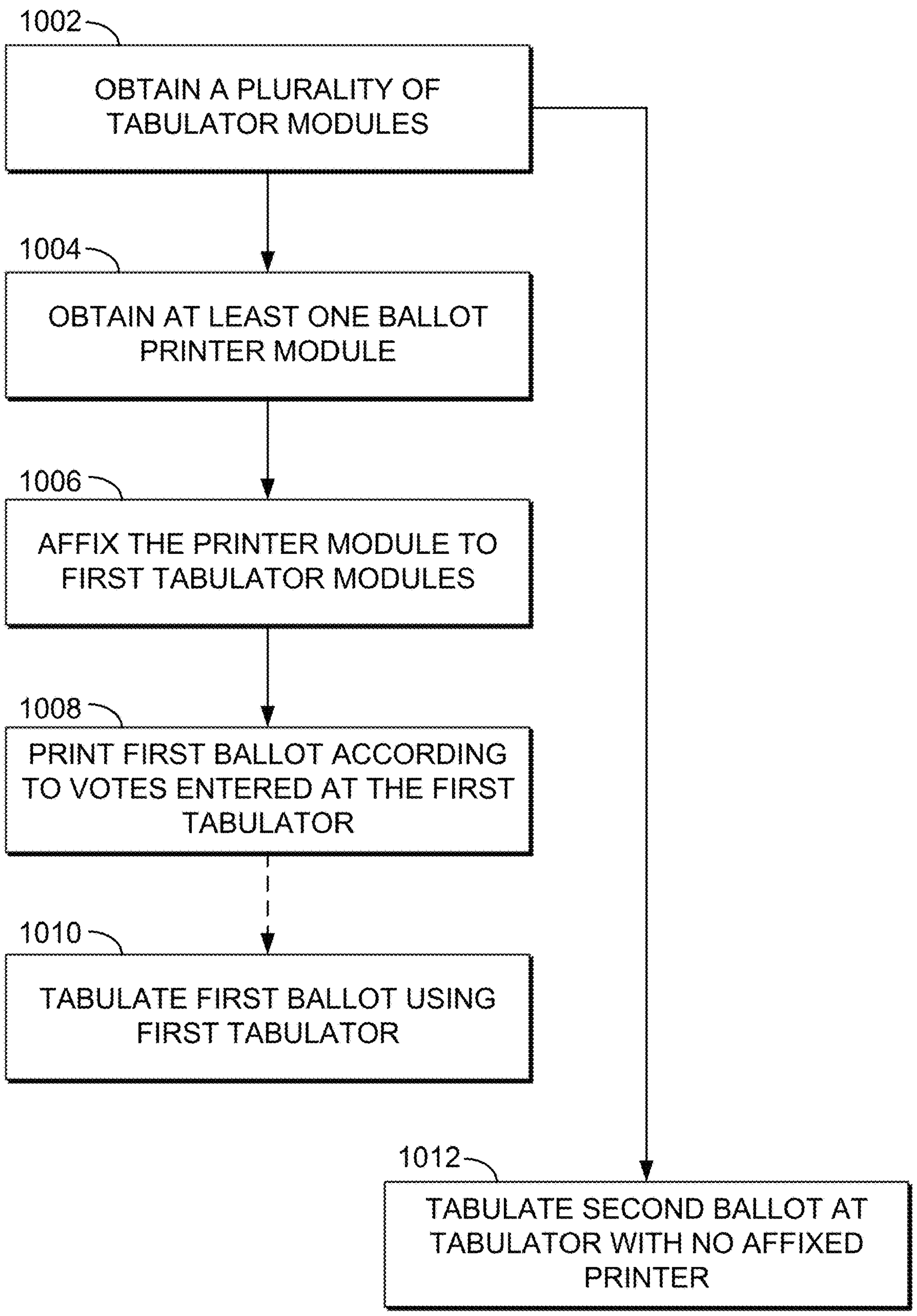
FIG. 10 is a flow diagram of a method performed using a modular accessible voting system according to an example embodiment.

A method performed in some embodiments is illustrated in the flow chart of FIG. 10. At 1002, a plurality of tabulators is obtained. Each of the plurality of tabulators has a user interface capable of receiving voter selections. At 1004, at least a first ballot printer is obtained. The first ballot printer is interchangeably affixable to any one of the plurality of tabulators. At 1006, the first ballot printer is mechanically affixed to a first one of the tabulators. This connection may be made using, for example, release mechanism such as the mechanism 626 illustrated in FIG. 6, or using another type of mechanical connection. An electrical connection, such as a USB or other electronic cable, may also be made between the first printer and the first tabulator. The electrical connection may be independent of the mechanical connection. At 1008, the first ballot printer is operated to print at least a first ballot according to voter selections received at the first tabulator. In some embodiments, as shown at 1010, the first tabulator may be operated to tabulate the first ballot printed by the first ballot printer. However, in other embodiments, a ballot may be tabulated at a tabulator that is different from the tabulator affixed to the printer used to print that ballot. At 1012, a second ballot is tabulated. The second ballot may be tabulated at a tabulator that is not affixed to any ballot printer. The second ballot may be, for example, a hand-marked ballot. In some embodiments, the first tabulator is also used to tabulate a ballot, e.g. a third ballot, that was not printed by the first printer. The third ballot may be a hand-marked ballot.

In some embodiments, the obtaining of at least a first ballot printer includes obtaining a plurality of ballot printers, where each of the ballot printers is interchangeably affixable to any one of the plurality of tabulators.

In some embodiments, the method further includes obtaining at least a first hands-free ballot adapter, the hands-free ballot adapter being removably engageable with any one of the plurality of tabulators and printers. The first hands-free ballot adapter is removably mechanically affixed to the first tabulator and to the first ballot printer. In some embodiments, the first hands-free ballot adapter can be affixed to and removed from a tabulator even while the tabulator is mechanically affixed to a printer. In such embodiments, a method may further include operating the first hands-free ballot adapter to direct a printed ballot from the printer paper output to the tabulator paper input.

In different embodiments, the tabulator, printer, and adapter modules may be obtained in different numbers. For example, the number of hands-free ballot adapters obtained may be less than the number of ballot printers. In turn, the number of ballot printers may be less than the number of tabulators.

In some embodiments, a system includes a tabulator, a ballot printer, and a hands-free ballot adapter. The tabulator has a top surface, a tabulator paper input, and a tabulator paper output. The ballot printer has a printer paper output and is removably mechanically affixable to the top surface of the tabulator. The hands-free ballot adapter is removably mechanically affixable between the tabulator and the ballot printer, such that when the ballot printer and the ballot adapter are affixed to the tabulator, the ballot adapter is operable to direct a printed ballot from the printer paper output to the tabulator paper input.

In some such embodiments, the ballot adapter and the ballot printer include complementary electrical connections configured to be engaged when the ballot adapter is affixed between the tabulator and the ballot printer. The ballot adapter may include at least one motor for driving a ballot through the ballot adapter, and power for the motor may be supplied to the ballot adapter through the complementary electrical connection with the ballot printer.

In some embodiments, the ballot printer is configured to transmit a signal regarding ballot feeding speed to the tabulator, e.g. using a digital optical data transmitter 646. The tabulator may receive the signal using a receiver component 648 and may synchronize a ballot feeding speed based on the signal or to take other actions as appropriate based on the signal.

In some embodiments, the tabulator includes a touch screen that is foldable between at least a first configuration in which the touch screen is substantially even with the top surface of the tabulator and at least a second configuration in which the touch screen extends upwards from the top surface. The touch screen may be hinged to be positionable at various different angles to accommodate voter preferences. The touch screen may be moveable even while a printer is affixed to the top surface of the tabulator.

In some embodiments, a tabulator apparatus includes a top surface having a printer support region capable of supporting a ballot printer. The top surface further includes a user interface region. The tabulator further includes a paper input, a paper output, and a paper path between the paper input and the paper output, with at least one optical scanner along the paper path. A touch screen is mounted on the user interface region of the top surface. The touch screen is foldable between at least a first configuration in which the touch screen is substantially even with the top surface and at least a second configuration in which the touch screen extends upwards from the top surface.

Figure 11A:
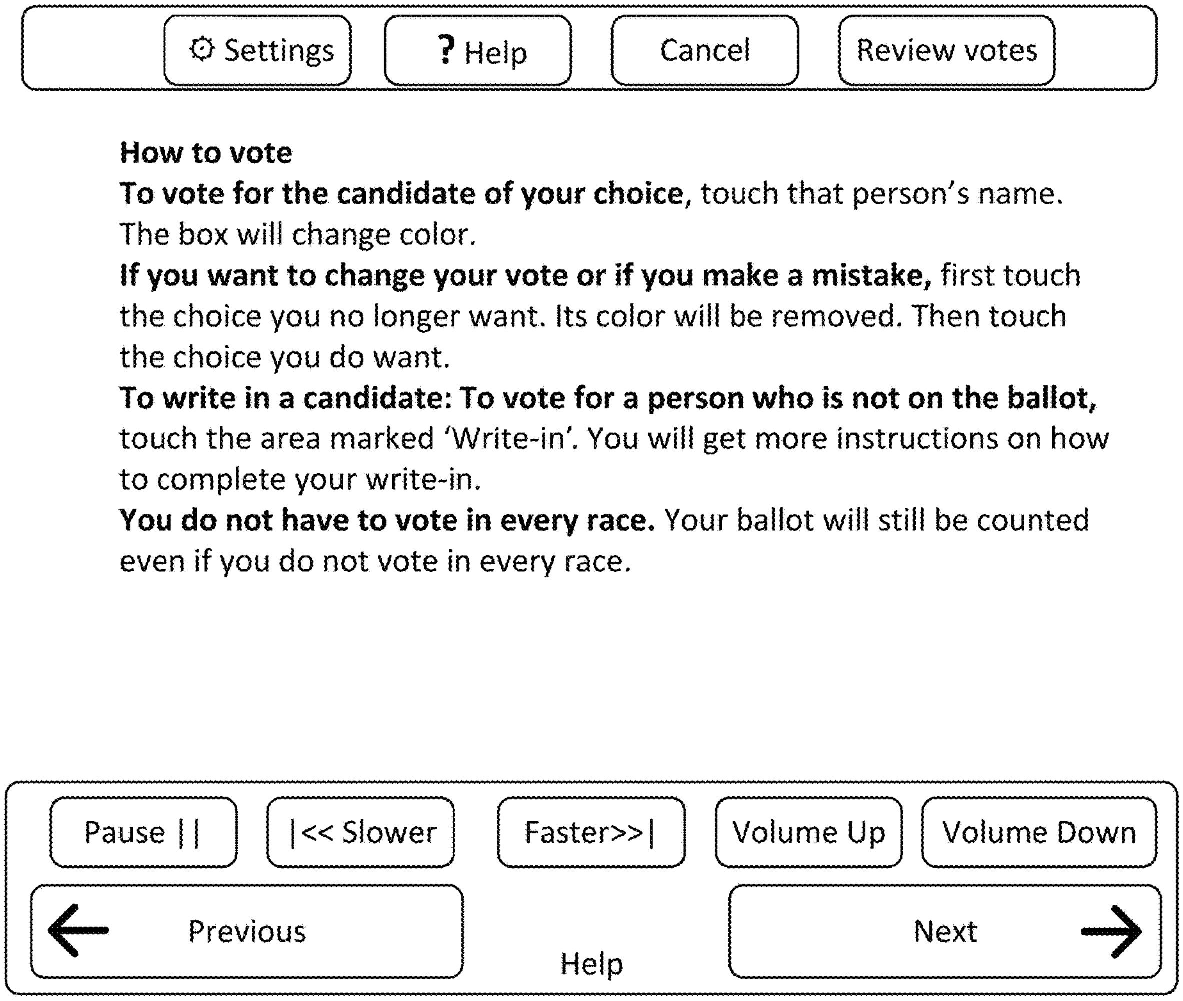
FIGS. 11A-11C illustrate examples of user interface screens that can be displayed to a voter according to some embodiments.
Figure 11B:
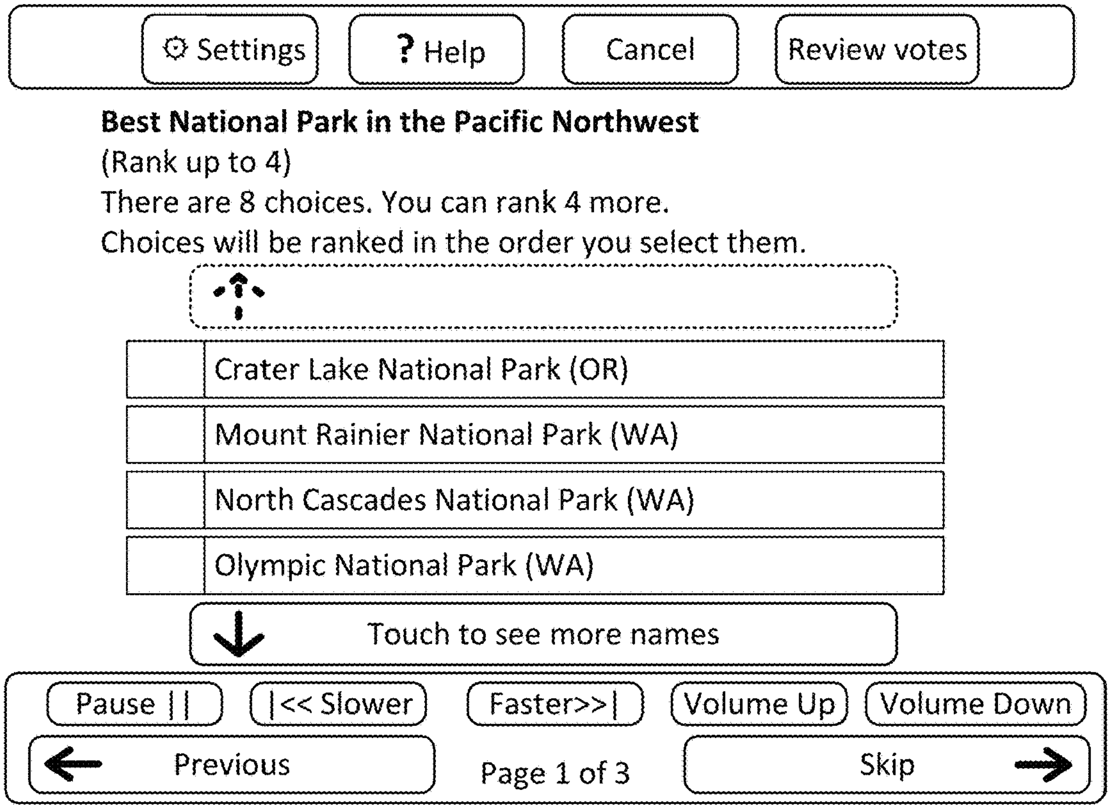
Figure 11C:
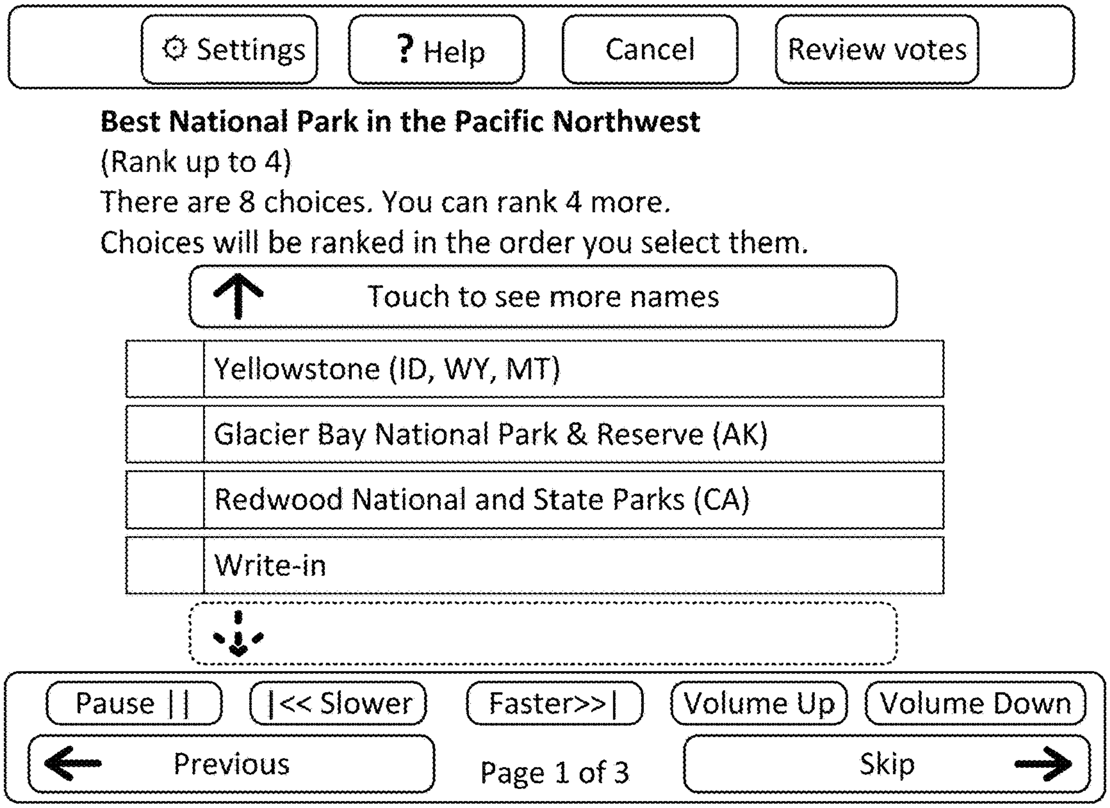
Figure 12:
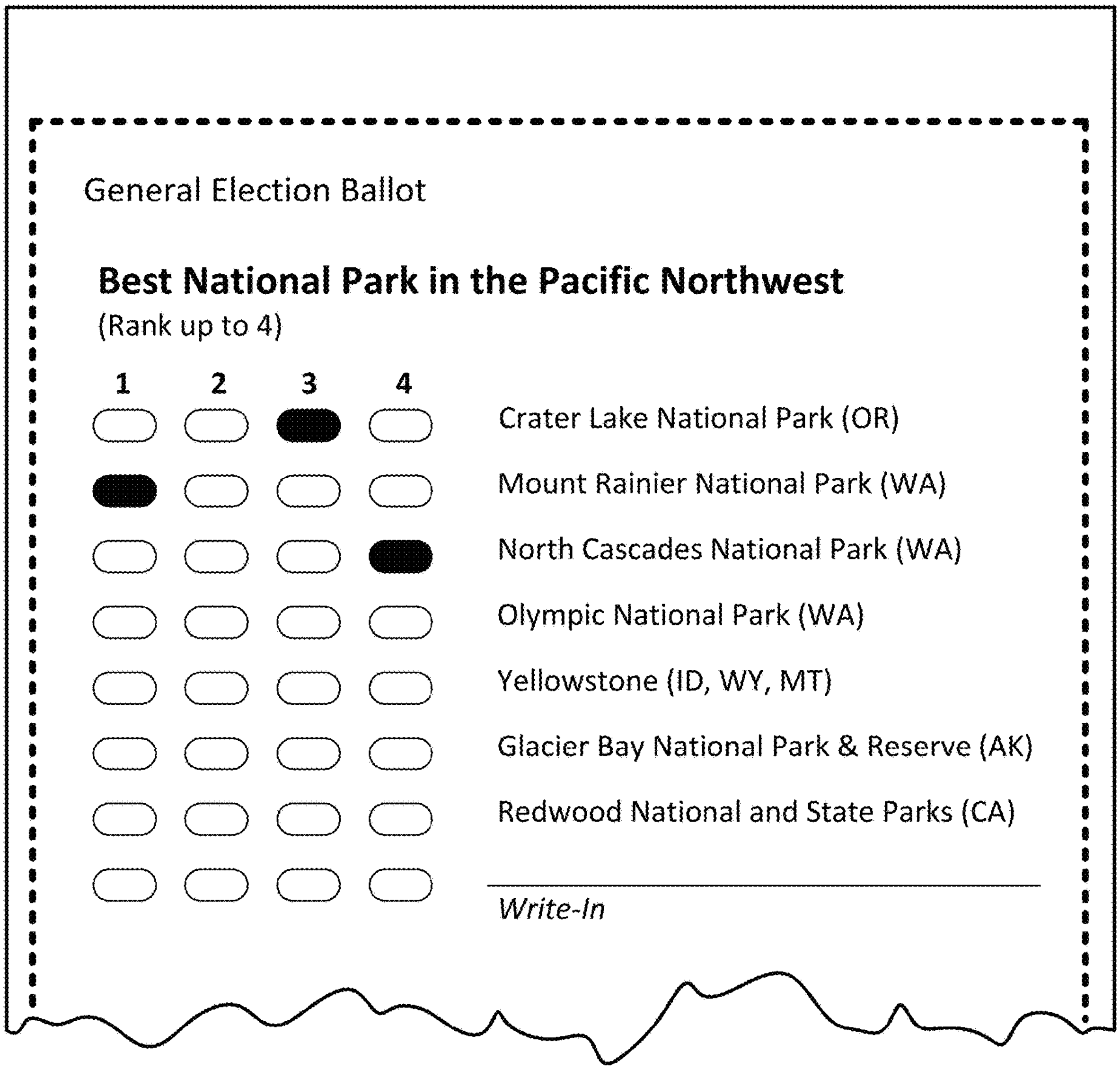
FIG. 12 schematically illustrates a portion of a ballot that can be printed by a ballot printer according to some embodiments.

In some embodiments, the tabulator may include logic for receiving voter selections through the touch screen and for instructing a ballot printer to print a ballot reflecting the voter's selections. As an example, FIGS. 11A-11C schematically illustrate different user interface screens that may be displayed on the touch screen, and FIG. 12 schematically illustrates a portion of a paper ballot that may be printed according to voter instructions entered using screens such as those in FIGS. 11A-11C. As seen in the example of FIG. 12, the printed paper ballot may show both selected and unselected contest options together with filled-in or empty vote target areas (e.g. ovals) indicating the voter selection as appropriate. While this example illustrates a contest that employs ranked-choice voting, it should be understood that embodiments described herein are not limited to use with any particular type of contest.

In some embodiments, the printer support region includes at least one aperture, e.g. opening or recess 630, capable of receiving corresponding protrusions from a ballot printer.

In some embodiments, the printer support region includes a removable cover capable of covering at least one aperture when the tabulator is not mated to a printer.

In some embodiments, the printer support region of the tabulator includes a sensor, such as receiver 648, configured to receive a signal regarding ballot feeding speed. The tabulator may be configured to synchronize a ballot feeding speed through the paper path or take other actions as appropriate based on the signal.

Figure 13:
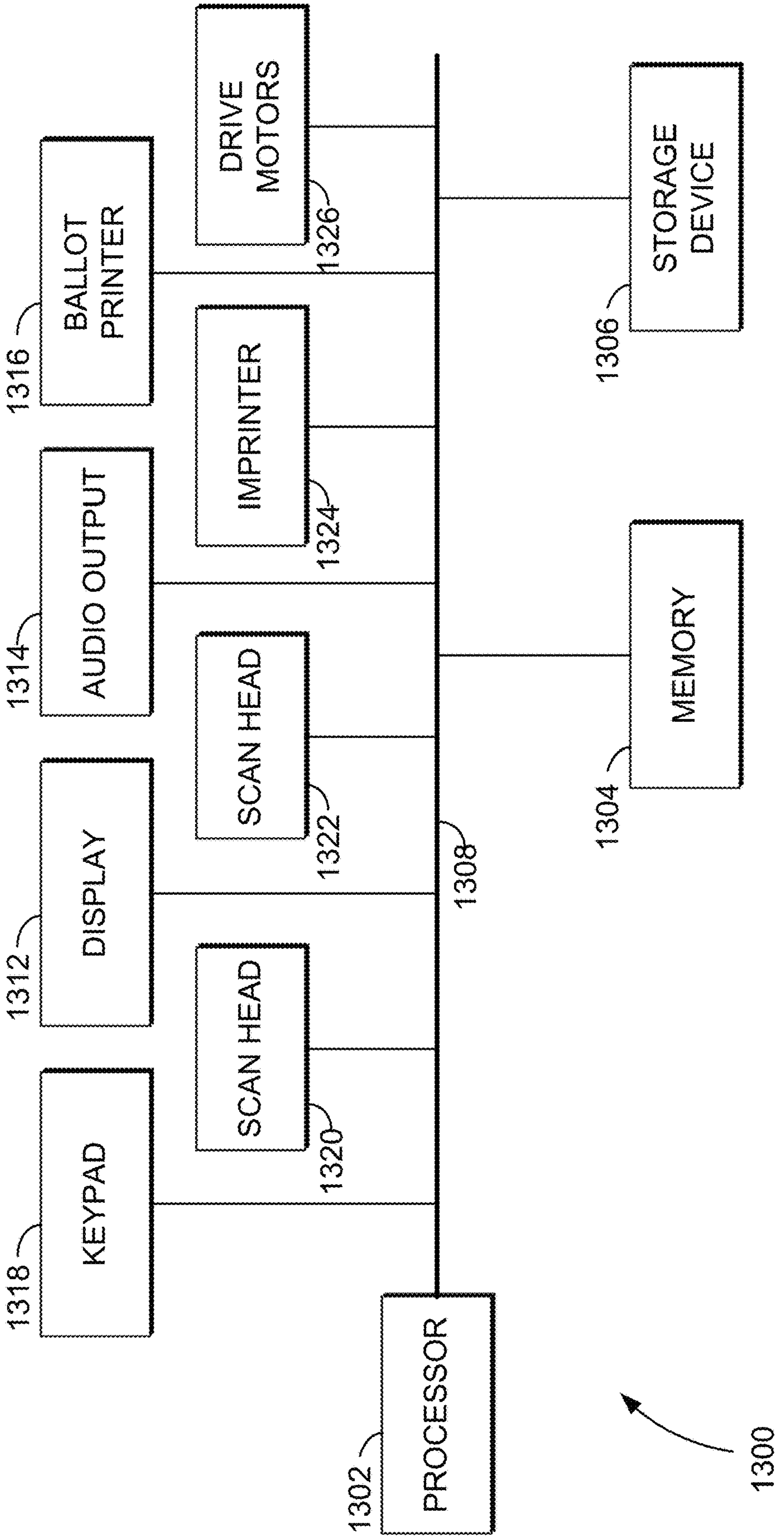
FIG. 13 is a functional block diagram illustrating logical components of an apparatus that may be used to implement some embodiments.

FIG. 13 illustrates an example system 1300 including a processor and associated peripheral and/or built-in devices that may be used as part of or associated with a tabulator system as described herein. System 1300 can be embodied as a system including the various components and modules described herein and is configured to perform one or more of the aspects described in this document. Some elements of system 1300, singly or in combination, can be embodied in a single integrated circuit (IC), multiple ICs, and/or discrete components. For example, in at least one embodiment, the processing elements of system 1300 are distributed across multiple ICs and/or discrete components. In various embodiments, the system 1300 is communicatively coupled to one or more other systems, or other electronic devices, via, for example, a communications bus or through dedicated input and/or output ports. In various embodiments, the system 1300 is configured to implement one or more of the aspects described in this document.

The system 1300 includes at least one processor 1302 configured to execute instructions loaded therein for implementing, for example, the various aspects described in this document. Processor 1302 can include embedded memory, input/output interface, and various other circuitries as known in the art. The system 1300 includes at least one memory 1304 (e.g., a volatile memory device, and/or a non-volatile memory device). System 1300 includes a storage device 1306, such as an embedded MultiMediaCard (eMMC), which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 1306 can include an internal storage device, and/or an attached storage device (including detachable and non-detachable storage devices), as non-limiting examples.

Program code to be loaded onto processor 1302 to perform the various aspects described in this document can be stored in storage device 1306 and subsequently loaded onto memory 1304 for execution by processor 1302. In accordance with various embodiments, one or more of processor 1302, memory 1304, and storage device 1306 can store one or more of various items during the performance of the processes described in this document. Such stored items can include, but are not limited to, data regarding the various voting options, data indicating whether those options are in a selected or unselected state, and where relevant, data indicating a ranking of the selected options.

In some embodiments, memory inside of the processor 1302 is used to store instructions and to provide working memory for processing. In other embodiments, however, a memory external to the processing device is used for one or more of these functions. The external memory can be the memory 1304 and/or the storage device 1306, for example, a dynamic volatile memory and/or a non-volatile flash memory.

Various elements of system 1300 can be provided within an integrated housing, Within the integrated housing, the various elements can be interconnected and transmit data therebetween using suitable connection arrangement 1308, for example, an internal bus as known in the art, wiring, cables, and/or printed circuit boards.

The system 1300 can provide an output signal to various output devices, including a display 1312, audio output 1314 (which may include speakers and/or an interface for connection with speakers and/or headphones), ballot printer 1316 or other printing equipment, and other peripheral devices. The display 1312 of various embodiments includes one or more of, for example, a touch screen display, an organic light-emitting diode (OLED) display, a curved display, and/or a foldable display. The display 1312 may be implemented using a monitor, a tablet, a laptop, a smartphone, or other device. The display 1312 may be integrated with other components (for example, as in a smartphone), or separate (for example, an external monitor for a laptop).

Further input components in some embodiments include a keypad 1318 which may be used as an alternative to or in addition to a touch screen for user input. One or more scan heads 1320, 1322 may be used to capture an image of a ballot. An imprinter 1324 may be used, for example, to print an identifier on a ballot. One or more drive motors 1326 may be used to propel a ballot through the system, for example to propel the ballot past the scan heads 1320, 1322 and/or to align an appropriate portion of the ballot with the imprinter 1324. One or more sensors (not illustrated) may be provided at various points along a paper path through the device to detect the presence and/or position of a ballot.

As described with respect to example embodiments of the present disclosure, different components of the system 1300 may be implemented in different modules. For example, the display 1312 may be implemented by, for example, the user interface 104 of the tabulator. The ballot marking device 1316 may be implemented by, for example, the ballot printer 106. The scan heads 1320, 1322 may be implemented using the optics 618, 620 of the tabulator. The imprinter 1324 may be implemented by the imprinter 622 of the tabulator. The drive motors 1326 may be implemented in some or all of the different modules, such as the ballot printer, the hands-free adapter, and the tabulator.

Other peripheral devices may include, in various examples of embodiments, assistive input devices including but not limited to sip-and-puff input devices.

In various embodiments, control signals are communicated among the components of the system 1300 using any signaling or communications protocol that enables device-to-device control with or without user intervention. The output devices can be communicatively coupled with other components via dedicated connections and/or through other interfaces. One or more of the components can be integrated into a single unit with the other components of system 1300. Alternatively, one or more of those components may be separate from one or more of the other components.

The embodiments can be carried out by computer software implemented by the processor 1302 or by hardware, or by a combination of hardware and software. As a non-limiting example, the embodiments can be implemented by one or more integrated circuits. The memory 1304 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1302 can be of any type appropriate to the technical environment, and can encompass one or more of microprocessors, general purpose computers, special purpose computers, and processors based on a multi-core architecture, as non-limiting examples.

The components of the system 1300 may be powered through a power supply such as a connection to an AC outlet and/or a battery system. The battery may be rechargeable through the connection to the AC outlet and may have sufficient capacity to serve as a backup to allow for voting and tabulation to continue in the event of a power outage or other loss of AC power.

Various methods are described herein, and each of the methods comprises one or more steps or actions for achieving the described method. Unless a specific order of steps or actions is required for proper operation of the method, the order and/or use of specific steps and/or actions may be modified or combined. Additionally, terms such as "first", "second", etc. may be used in various embodiments to modify an element, component, step, operation, etc. Use of such terms does not imply an ordering to the modified operations or a positioning of the modified components unless specifically required.

Embodiments described herein may be carried out by computer software implemented by a processor or other hardware, or by a combination of hardware and software. As a non-limiting example, the embodiments can be implemented by one or more integrated circuits. The processor can be of any type appropriate to the technical environment and can encompass one or more microprocessors, general purpose computers, special purpose computers, and processors based on a multi-core architecture, as non-limiting examples.

When a figure is presented as a flow diagram, it should be understood that it also provides a block diagram of a corresponding apparatus. Similarly, when a figure is presented as a block diagram, it should be understood that it also provides a flow diagram of a corresponding method/process.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this disclosure are not necessarily all referring to the same embodiment.

As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Various hardware elements of one or more of the described embodiments may be implemented as modules that carry out (i.e., perform, execute, and the like) various functions that are described herein in connection with the respective modules. As used herein, a module includes hardware (e.g., one or more processors, one or more microprocessors, one or more microcontrollers, one or more microchips, one or more application-specific integrated circuits (ASICs), one or more field programmable gate arrays (FPGAs), one or more memory devices) deemed suitable for a given implementation. Each described module may also include instructions executable for carrying out the one or more functions described as being carried out by the respective module, and it is noted that those instructions could take the form of or include hardware (i.e., hardwired) instructions, firmware instructions, software instructions, and/or the like, and may be stored in any suitable non-transitory computer-readable medium or media, such as media commonly referred to as RAM, ROM, etc.

Although features and elements are described above in particular combinations, each feature or element can be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Other variations of the described embodiments are contemplated. The above-described embodiments are intended to be illustrative, rather than restrictive, of the present invention. The scope of the invention is thus not limited by the examples given above but rather is defined by the following claims.

The invention claimed is:

1. A method comprising:

obtaining a plurality of tabulators, each of the plurality of tabulators having a user interface capable of receiving voter selections;

obtaining at least a first ballot printer, the first ballot printer being interchangeably affixable to any one of the plurality of tabulators;

mechanically affixing the first ballot printer to a first one of the tabulators;

operating the first ballot printer to print at least a first ballot according to voter selections received at the first tabulator; and operating at least a second one of the tabulators to tabulate at least a second ballot, the second tabulator not being affixed to any ballot printer.

2. The method of claim 1, wherein the second ballot is a hand-marked ballot.

3. The method of claim 1, wherein obtaining at least a first ballot printer comprises obtaining a plurality of ballot printers, each of the ballot printers being interchangeably affixable to any one of the plurality of tabulators.

4. The method of claim 1, further comprising electronically connecting the first ballot printer to the first tabulator.

5. The method of claim 1, further comprising:

obtaining at least a first hands-free ballot adapter, the hands-free ballot adapter being removably engageable with any one of the plurality of tabulators; and mechanically affixing the first hands-free ballot adapter to the first tabulator and to the first ballot printer.

6. The method of claim 5, further comprising operating the first hands-free ballot adapter to direct a printed ballot from the printer paper output to the tabulator paper input.

7. The method of claim 5, wherein a number of hands-free ballot adapters obtained is less than a number of ballot printers obtained.

8. The method of claim 1, wherein a number of ballot printers obtained is less than a number of tabulators obtained.

9. The method of claim 1, wherein each of the first plurality of tabulators are operated using application software, and wherein the application software is the same for all of the first plurality of tabulators.

10. A system comprising:

a tabulator having a top surface, a tabulator paper input, and a tabulator paper output;

a ballot printer, the ballot printer being removably mechanically affixable to the top surface of the tabulator, the ballot printer having a printer paper output; and a hands-free ballot adapter, the ballot adapter being removably mechanically affixable between the tabulator and the ballot printer, such that when the ballot printer and the ballot adapter are affixed to the tabulator, the ballot adapter is operable to direct a printed ballot from the printer paper output to the tabulator paper input.

11. The system of claim 10, wherein the ballot adapter and the ballot printer include complementary electrical connections configured to be engaged when the ballot adapter is affixed between the tabulator and the ballot printer.

12. The system of claim 11, wherein the ballot adapter includes at least one motor for driving a ballot through the ballot adapter, and wherein power for the motor is supplied to the ballot adapter through the complementary electrical connection with the ballot printer.

13. The system of claim 10, wherein the ballot printer is configured to transmit a signal regarding ballot feeding to the tabulator.

14. The system of claim 13, wherein the tabulator is configured to synchronize ballot feeding based on the signal.

15. The system of claim 13, wherein the signal is an optical signal.

16. The system of claim 10, wherein the tabulator further includes a touch screen that is foldable between at least a first configuration in which the touch screen is substantially even with the top surface and a second configuration in which the touch screen extends upwards from the top surface.

* * * * *